J. J. CHARBONNEAU.
MONORAIL AND TRUCK.
APPLICATION FILED SEPT. 9, 1910.
991,954.
Patented May 9, 1911.
2 SHEETS—SHEET 1.
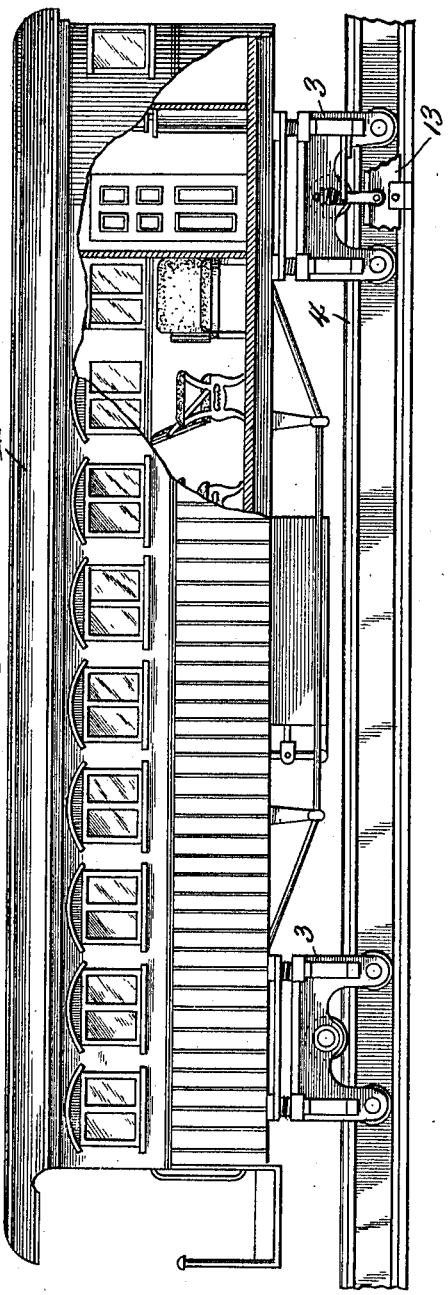
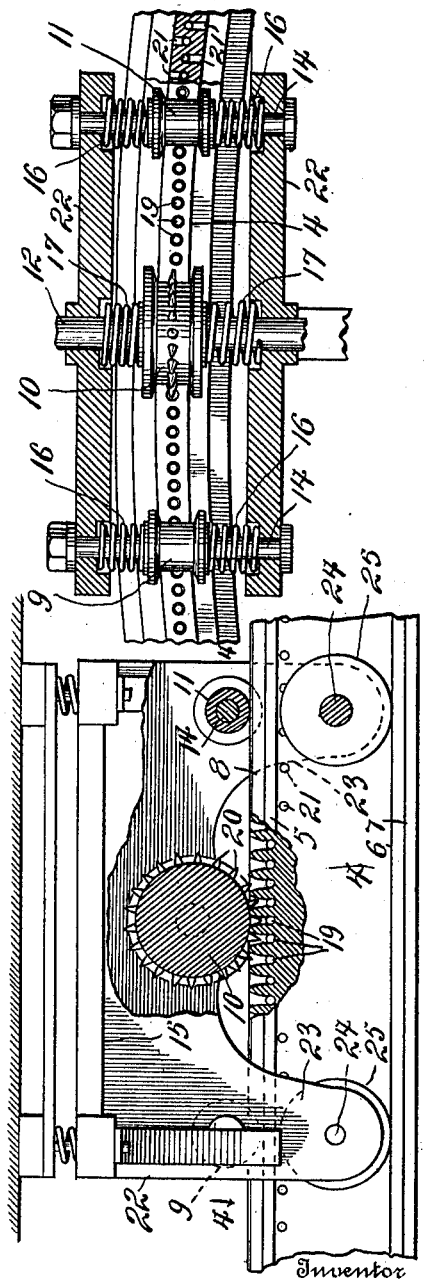
Inventor
James J. Charbonneau
By Victor J. Evans,
Attorney
Witnesses

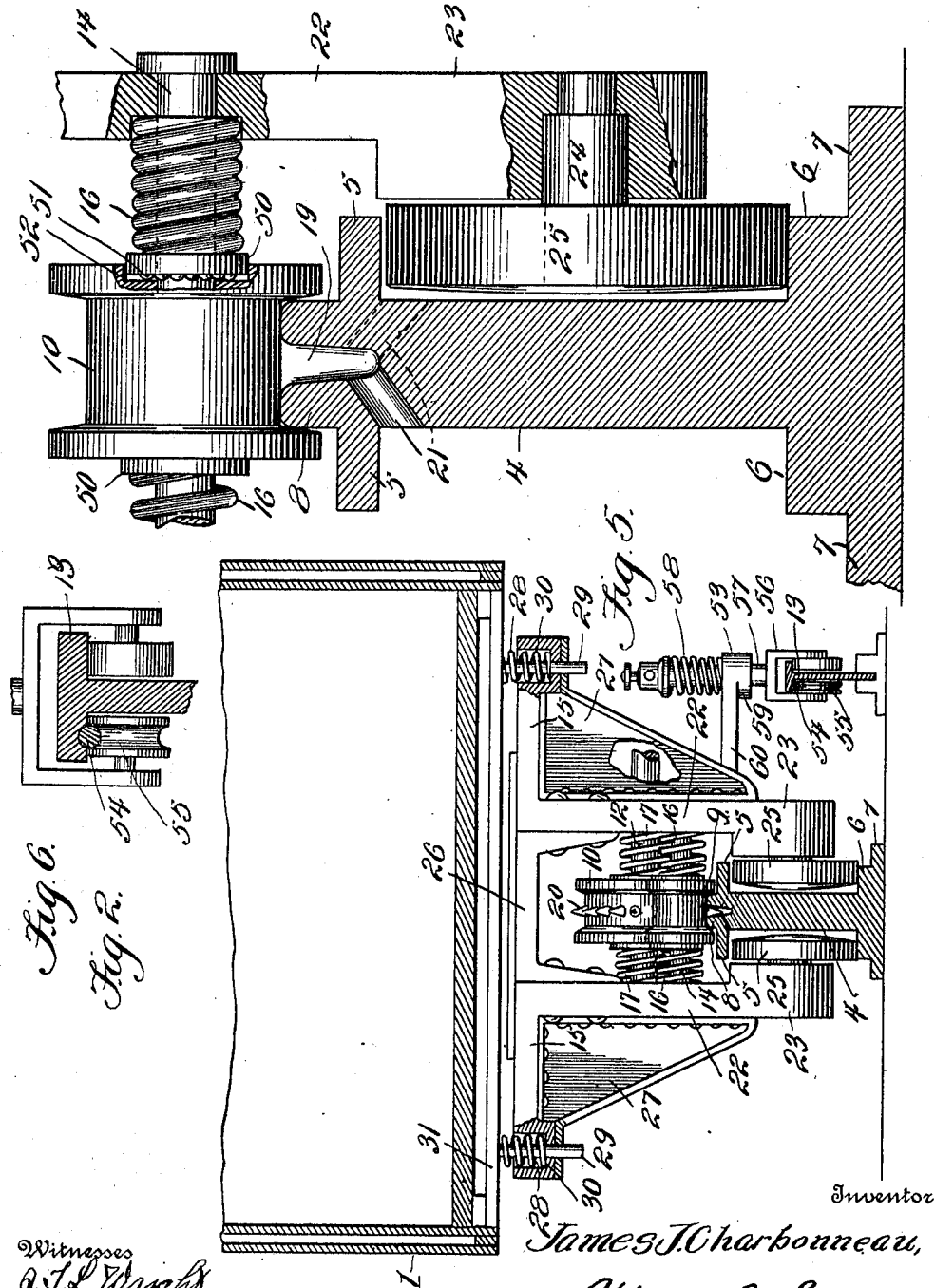

UNITED STATES PATENT OFFICE.

JAMES J. CHARBONNEAU, OF NASHUA, NEW HAMPSHIRE.

MONORAIL AND TRUCK.

991,954.  Specification of Letters Patent.  Patented May 9, 1911.

Application filed September 9, 1910. Serial No. 581,187.

*To all whom it may concern:*

Be it known that I, JAMES J. CHARBONNEAU, a citizen of the United States, residing at Nashua, in the county of Hillsboro and State of New Hampshire, have invented new and useful Improvements in Monorails and Trucks; of which the following is a specification.

This invention relates to mono railways and has for its principal object to secure smooth running of the trucks and to increase the safety and durability of the system.

With the above, and other objects in view, which will appear as the description progresses, the invention resides in the novel construction and combination of parts hereinafter fully described and claimed.

In the accompanying drawings, Figure 1 is a side elevation of a mono rail and a truck constructed in accordance with the present invention; Fig. 2 is an enlarged vertical transverse sectional view of the same; Fig. 3 is an enlarged elevation, partly in section of the truck; Fig. 4 is a sectional view upon the line 4—4 of Fig. 3; Fig. 5 is an enlarged detail transverse sectional view of the monorail and a portion of the truck; Fig. 6 is a similar sectional view taken through the track 13 and the conductor 57.

In the accompanying drawings the numeral 1 designates a car adapted for use upon my improved system and provided with the forward and rearward trucks designated by the numerals 3. These trucks are provided with suitable wheels hereinafter to be set forth and are adapted to run upon a mono rail designated by the numeral 4.

The mono rail as clearly illustrated in Fig. 2 of the drawings comprises a plate having its sides provided with integrally formed off-set ears 5 adjacent its upper portion and its lower portion provided with treads 6 adjacent its base 7. The portion or tread 8 extending above the ears 5 are adapted to engage flanged wheels 9, 10, and 11. The wheel 10 is of a larger circumference than the wheels 9 and 11 and this wheel serves as the driver for the car. The wheel 10 is mounted upon a suitable shaft 12 which receives its energy from a suitable source of power derived from a conductor track 13 positioned adjacent the mono rail 4. The axles 14 of the wheels 9 and 11 are mounted in suitable bearings provided in the truck frame 15. These flanged wheels 9 and 11 have their axles each provided with suitable pressure springs 16 which bear between the faces of the said wheels and the sides of the frame 15. The wheels 9 and 11 are provided with suitable grooves and the axles 14 are provided with splines adapted to engage the said grooves. The axle 15 is also provided with a pair of springs 17 which are adapted to bear against the opposite faces of the wheels 10 between the sides of the frame 15 so as to equalize the lateral movement of the said shaft 12 while the truck is rounding curves, as best illustrated in Fig. 4 of the drawings. If desired, the tread 8 of the mono rail may be provided with spaced openings designated by the numeral 19 and the motive wheel 10 may be provided with a plurality of teeth 20 adapted to coöperate with the said openings 19. The openings 19 are provided with oppositely arranged drip openings 21 whereby the accumulation of water, etc. may have free exit and the clogging of the openings is prevented.

The frame 15 comprises essentially a pair of members 22 and these members 22 have their front and rear portions provided with depending bearing members 23, the same being adapted for the reception of the axles 24 of counterbalancing wheels 25. These wheels 25 rest between the tread 6 and the offsets or flanges 5 of the rails 4, and by this arrangement, it will be noted that the tilting of the car in either direction is effectively obviated. The members 22 of the frame 15 are connected at their upper extremity as designated by the numeral 26 and the sides of the frame are provided with depressed brackets 27. These brackets 27 have suitable recesses or pockets 28, and the said pockets are provided with slidable rods 29 upon which are mounted cushion springs 30. The rods 29 connect with a transversely arranged member 31 which is secured to the under face of the car 1.

From the above description, it will be noted that the improved system affords a perfect cushion for the car as well as obviating the grating sound of the wheels when rounding a curve, the compensating springs and wheels 9 and 11 materially assisting the motive wheel 10 in retaining its proper position upon the tread 8, while the wheels 25 playing between the flanges 5 and the tread 6 render the device entirely safe.

It will be noted that the axles 14 are provided with collars 50 adjacent their points of contact with the wheels 10 and the said collars are provided each with an annular groove or recess which forms a raceway for bearing balls 51, and the said collar and balls are adapted to be received within a recess 52 provided in the flanges of the said wheel member 10. It will be further noted that by providing the device with the offset conductor member 53, an ordinary electric wire 54 may be employed in lieu of the track 13. The grooved wheel 55 of the said conductor is mounted between the bifurcated arms 56 of a stem 57, and the said stem is normally forced upwardly through the medium of a helical spring 58 which passes through an eye 59 provided upon a transverse bar 60. By this means, it will be readily understood that the wheel 53 is at all times held tightly in engagement with the wire 54, so that danger of the said wire slipping away or becoming disengaged from the wheel 55 is entirely obviated.

Having thus fully described the invention, what I claim as new is:—

1. A truck for mono railways comprising spaced side members, a connection between the side members at the top thereof, brackets upon the side members, cushions upon the brackets, a pair of spaced axles upon the sides of the truck, grooved wheels upon these axles, resilient elements upon the axles and positioned adjacent each of the faces of the wheel, a shaft intermediate of the grooved wheels, a motive wheel upon the shaft, resilient elements bearing upon the motive wheel, depending bearings provided upon the sides of the frame adjacent the front and rear thereof, and wheels mounted within these bearings.

2. A mono railway comprising a rail provided with a separate upper tread, offset flanges upon each side of the rail below the tread, tread members upon each side of the rail below the offset, a frame provided with wheels engaging between the treads and the offsets, said frame being further provided with a pair of flanged wheels mounted in yieldable bearings and bearing upon the upper tread and the rail, and the frame being further provided with a motive wheel and resilient members between the motive wheel and the sides of the frame.

In testimony whereof I affix my signature in presence of two witnesses.

JAMES J. CHARBONNEAU.

Witnesses:
H. P. GREELEY,
WILLIAM H. BARRY.

---

Copies of this patent may be obtained for five cents each, by addressing the "Commissioner of Patents, Washington, D. C."